(12) United States Patent
Ou

(10) Patent No.: US 8,900,077 B2
(45) Date of Patent: Dec. 2, 2014

(54) SPORTSBALL WITH INTEGRAL BALL CASING AND BLADDER BODY

(75) Inventor: Tsung Ming Ou, Kaohsiung (TW)

(73) Assignee: Topball Sports Inc., Kaohslung (TW)

( * ) Notice: Subject to any disclaimer, the term of this patent is extended or adjusted under 35 U.S.C. 154(b) by 217 days.

(21) Appl. No.: 12/070,557

(22) Filed: Feb. 19, 2008

(65) Prior Publication Data

US 2009/0209374 A1    Aug. 20, 2009

(51) Int. Cl.
A63B 41/10    (2006.01)

(52) U.S. Cl.
CPC .................................... *A63B 41/10* (2013.01)
USPC .......................................... 473/604; 473/605

(58) Field of Classification Search
USPC .................... 473/603–605, 596, 597
See application file for complete search history.

(56) References Cited

U.S. PATENT DOCUMENTS

| | | | | |
|---|---|---|---|---|
| 2,116,479 A * | 5/1938 | Reach | ........................... | 473/604 |
| 2,143,409 A * | 1/1939 | Denkert | ........................ | 473/597 |
| 2,214,179 A * | 9/1940 | Reach | ........................... | 156/147 |
| 2,495,079 A * | 1/1950 | Sonnett et al. | ................ | 473/597 |
| 3,256,019 A * | 6/1966 | Barton | ........................... | 473/597 |
| 3,459,425 A * | 8/1969 | Holman | ........................ | 473/605 |
| 3,508,750 A * | 4/1970 | Henderson | ..................... | 473/605 |
| 5,752,890 A * | 5/1998 | Shishido et al. | .............. | 473/599 |
| 5,888,157 A * | 3/1999 | Guenther et al. | ............. | 473/604 |
| 5,931,752 A * | 8/1999 | Guenther et al. | ............. | 473/597 |
| 6,099,423 A * | 8/2000 | Ou | ................. | 473/604 |
| 6,123,633 A * | 9/2000 | Guenther et al. | ............. | 473/604 |
| 6,506,135 B2 * | 1/2003 | Ou | ................. | 473/604 |
| 2007/0238562 A1 * | 10/2007 | Nagao et al. | .................. | 473/605 |
| 2008/0032834 A1 * | 2/2008 | Krysiak | ........................ | 473/597 |

* cited by examiner

*Primary Examiner* — Steven Wong
(74) *Attorney, Agent, or Firm* — Raymond Y. Chan; David and Raymond Patent Firm

(57) ABSTRACT

A sportsball includes a barebone ball and an outer ball cover. The barebone ball includes an inflatable bladder body and a ball casing. The ball casing, which is formed in an integrated structure, has an outer circumferential surface, an inner circumferential surface to define an interior cavity to fittingly enclose the bladder body therein, and a plurality of pre-formed channels integrally and indently formed on the outer circumferential surface, such that the ball casing and the bladder body enclosed therewithin form a one piece integrated semi-product of the sportsball. The outer ball cover comprising a plurality of outer cover panels overlapping on the outer circumferential surface of the ball casing at a position that edges of each of the outer cover panels are aligned with the corresponding pre-formed channels respectively.

6 Claims, 8 Drawing Sheets

SPORTSBALL WITH INTEGRAL BALL CASING AND BLADDER BODY

BACKGROUND OF THE PRESENT INVENTION

1. Field of Invention

The present invention relates to a ball, and more particularly to a sportsball comprising a barebone ball having an integral structure for optimizing a structural strength of the sportsball.

2. Description of Related Arts

A conventional sportsball, such as a conventional soccer ball, usually comprises a ball bladder and a ball cover enclosing the ball bladder, wherein the ball cover is constructed by a plurality of cover panels stitched in an edge-to-edge manner and each cover panel is strengthened and supported with one or more lining layers when the ball cover is made of synthetic leather.

In order to prevent additional lining adhered onto the ball cover so as to lower the material cost and manufacturing cost while providing a bladder with better strength and flexibility and impact resistance, U.S. Pat. No. 5,772,545 teaches a sportsball which comprises a ball bladder strengthened by a web layer, and a ball cover. The ball cover comprises a plurality of cover panels attached on the ball bladder, wherein each of the carcass panels is usually stitched to adjacent carcass panels for forming a substantially round sportsball. Traditionally, much has been done in the development of the ball bladder and intermediate construction between the ball bladder and the ball carcass.

U.S. Pat. No. 6,663,520 provides a ball pocket bladder which is an intermediate construction ball pocket for better receiving and supporting the inflatable bladder so as to retain and enhance the roundness of the ball without reducing the softness thereof.

The conventional sportsballs as mentioned above are stitched sportsballs that require expensive and time-consuming manufacturing procedures of stitching the cover panels together while it is difficult to produce optimal roundness, for example it is difficult for sharp corners to be adequately stitched with adjacent cover panels. Moreover, the cover panels need to be strengthened and supported by lining layers and cushion pads that not only requires additional producing steps but also increases the difficulty of the stitching process.

U.S. Pat. No. 6,685,585 discloses a ball having a stitch-less structure, which discloses a ball for a ball game comprising an elastic bladder, a reinforced layer, and a plurality of leather panels. More specifically, each of the leather panels is bonded onto the reinforced layer, wherein a peripheral edge portion of each leather panels is folded toward an inside. A thickness adjusting member is disposed in a void defined by the folded peripheral portions and bonded onto a back of each leather panel. Although this sportsball does not involve stitching on the leather panels, it contains the following unsolved disadvantages.

First, the '585 patent specifically discloses that each of the leather panels is inwardly folded at the corresponding peripheral portion to bond with the thickness adjusting member, and thus each the leather panels must have two portions, a main portion above the thickness adjusting member, and a peripheral portion bonded at side portions of the corresponding thickness adjusting member. Accordingly, the problem with this construction is that while the main portion of each of the leather panels is elastically supported by the thickness adjusting member, the corresponding peripheral portion does not. As a result, the sportsball suffers from non-uniform cushion effect because of the bonding technique of the leather panels. When a user of that invention kicks on the main portion of the leather panel, he will enjoy substantial cushioning effect from the thickness adjusting member. However, when the user kicks on the peripheral portion of the leather panel, he will cease to enjoy the same amount of cushioning effect as if he kicks on the main portion.

Second, it is apparently that, in order to manufacture the ball stated in the '585 patent, one must take substantial amount of time for precise and effective attachment between the thickness adjusting member and the leather panels, and for precise alignment of the edges of leather panels with each other. In other words, the manufacturing process of the ball disclosed in the '585 patent is time-consuming, troublesome in manual steps and expensive in cost.

Another problem for traditional sportsballs is that no matter how good the stitching and/or the construction of leather panels, the ball bladder and the ball carcass are inherently two different components. The ball carcass attached onto the ball bladder with an inner lining therebetween is difficult to produce a true roundness and a durable structure with strengthened impact resistance.

SUMMARY OF THE PRESENT INVENTION

One object of the present invention is to provide a sportsball comprising a barebone ball having an integral structure for optimizing a structural strength of the sportsball.

Another object of the present invention is to provide a sportsball having a barebone ball structure to overcome the insecure attachment disadvantage for conventional sportsball, wherein the bladder, the strengthen lining layer and the cushion ball casing are integrally molded to construct the durable barebone ball to ensure a true roundness of the ball, to minimize the stress created between the connecting edges of the ball carcass and the inflatable bladder, and to reduce the impact force for the player.

Another object of the present invention is to provide a sportsball which comprises a barebone ball constructed to enable the ball cover panels attaching thereon without stitching.

Another object of the present invention is to provide a sportsball comprising a barebone ball, wherein the sportsball can be manufactured into a wide variety of ball types, so as to facilitate widespread applications of the present invention. For example, the sportsball can be manufactured as a soccer ball, an America football, or a volley ball with even cushioning throughout the entire sportsball.

Another object of the present invention is to provide a method of manufacturing a sportsball comprising a barebone ball having an integral structure for optimizing a structural strength of the sportsball.

Another object of the present invention is to provide a method of manufacturing a sportsball, which can reduce the manufacturing steps and cost of a sportsball with strengthened and durable structure.

Accordingly, in order to accomplish the above objects, the present invention provides a sportsball, comprising:

a barebone ball, which comprises an inflatable bladder body; and a ball casing, which is formed in an integrated structure, having an outer circumferential surface, an inner circumferential surface to define an interior cavity to fittingly enclose the bladder body therein, and a plurality of pre-formed channels integrally and indently formed on the outer circumferential surface, such that the ball casing and the bladder body enclosed therewithin form a one-piece integrated semi-product of the sportsball; and a ball cover comprising a plurality of outer cover panels attached on the outer circumferential surface of the ball casing of the barebone ball in such a manner that edges of each of the outer cover panels are aligned with the corresponding pre-formed channels respectively.

To produce the above sportsball, the present invention provides a method of manufacturing a sportsball, which comprises the steps of:

(a) providing an inflatable bladder body and a ball casing having a shape corresponding to the bladder body after being inflated;

(b) placing the bladder body and the ball casing in a casing mold that the bladder body is enclosed within the ball casing;

(c) vulcanizing the ball casing with heat to integrally bond the ball bladder with the ball casing to form a one-piece integrated barebone ball as a semi-product of the sportsball, and to integrally and indently form a plurality of pre-formed channels on an outer circumferential surface of the ball casing; and (d) attaching a plurality of cover panels on the outer circumferential surface of the ball casing in such a manner that edges of each of the outer cover panels are aligned with the corresponding pre-formed channels respectively to form a ball cover enclosing the barebone ball 10.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
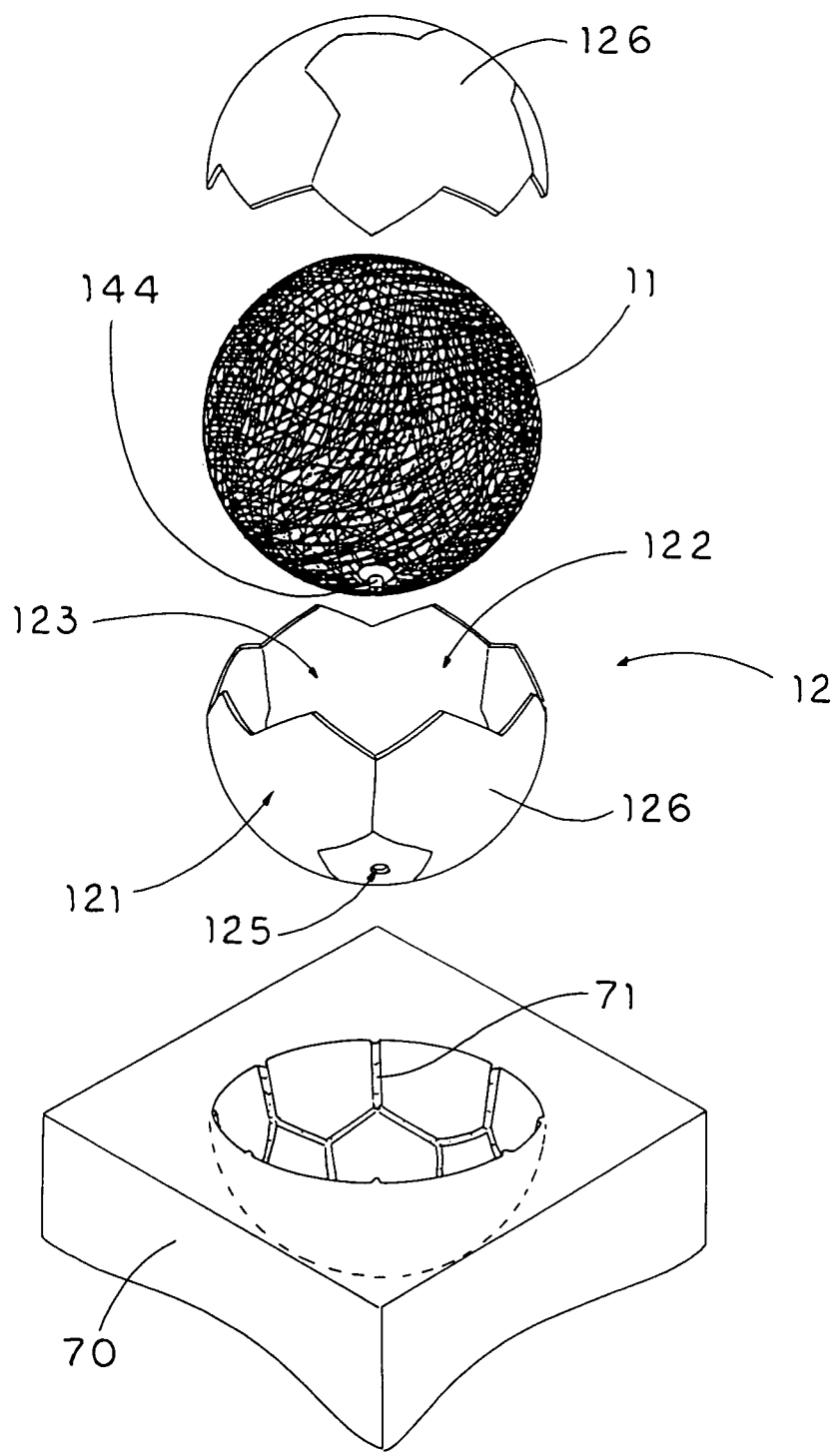
FIG. 1A to FIG. 1D is schematic diagrams of a method of manufacturing a sportsball according to a preferred embodiment of the present invention.
Figure 1B:
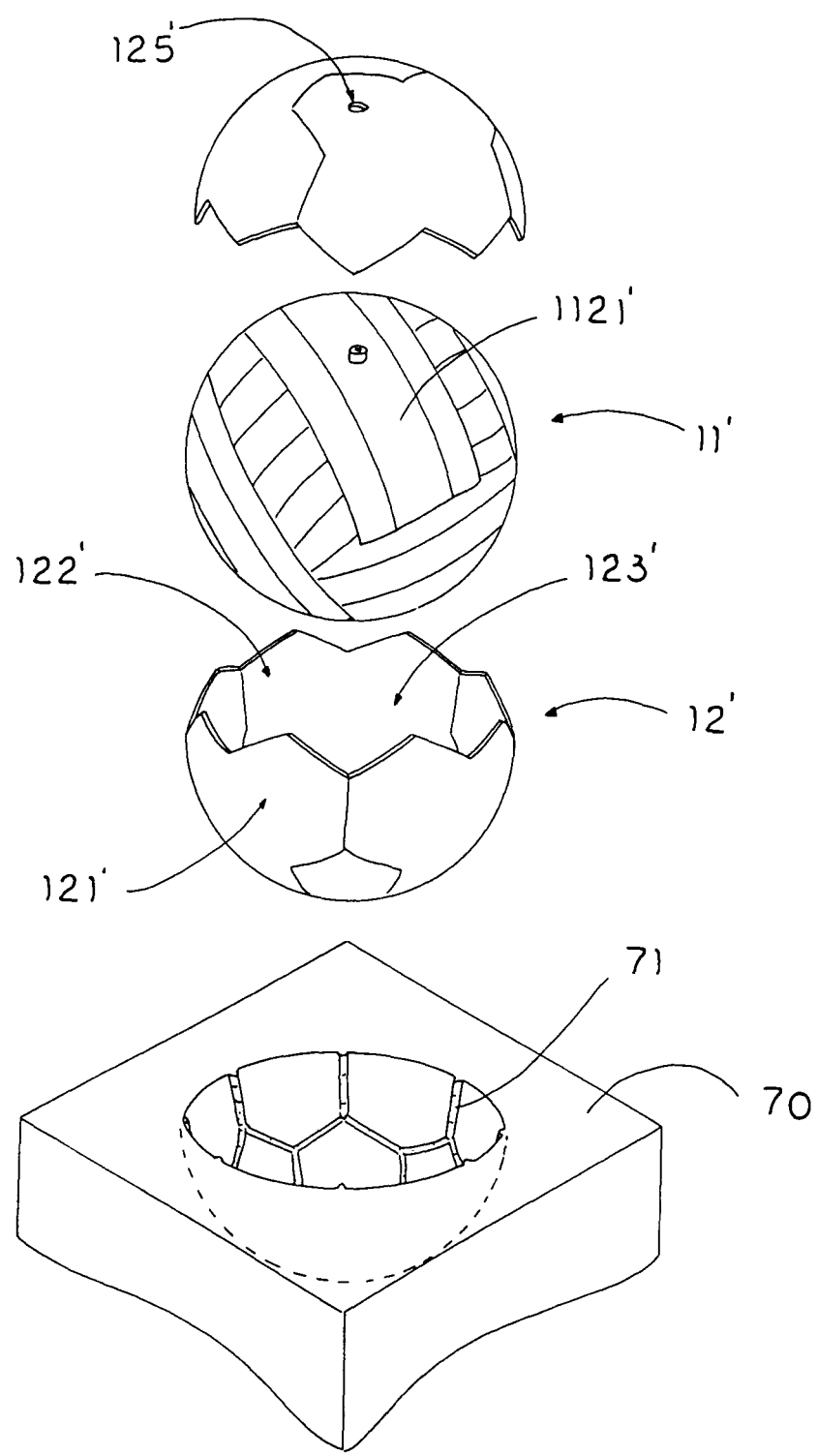
Figure 1C:
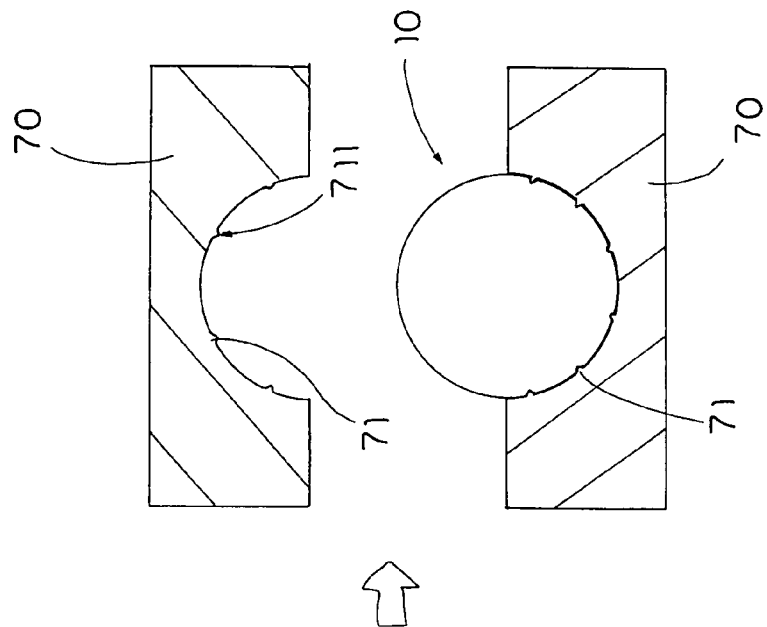
Figure 1C:
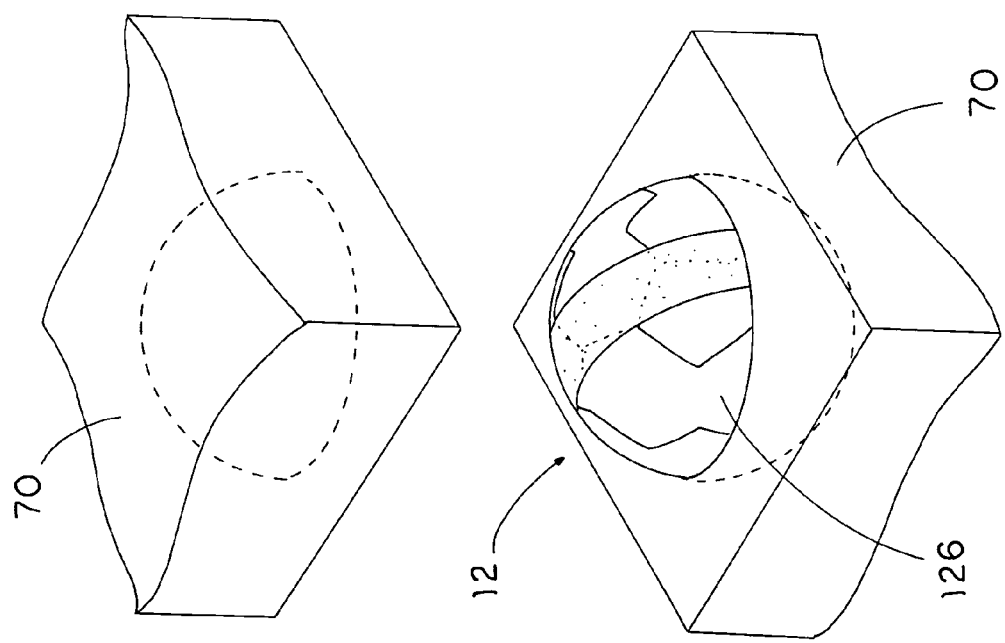
Figure 1D:
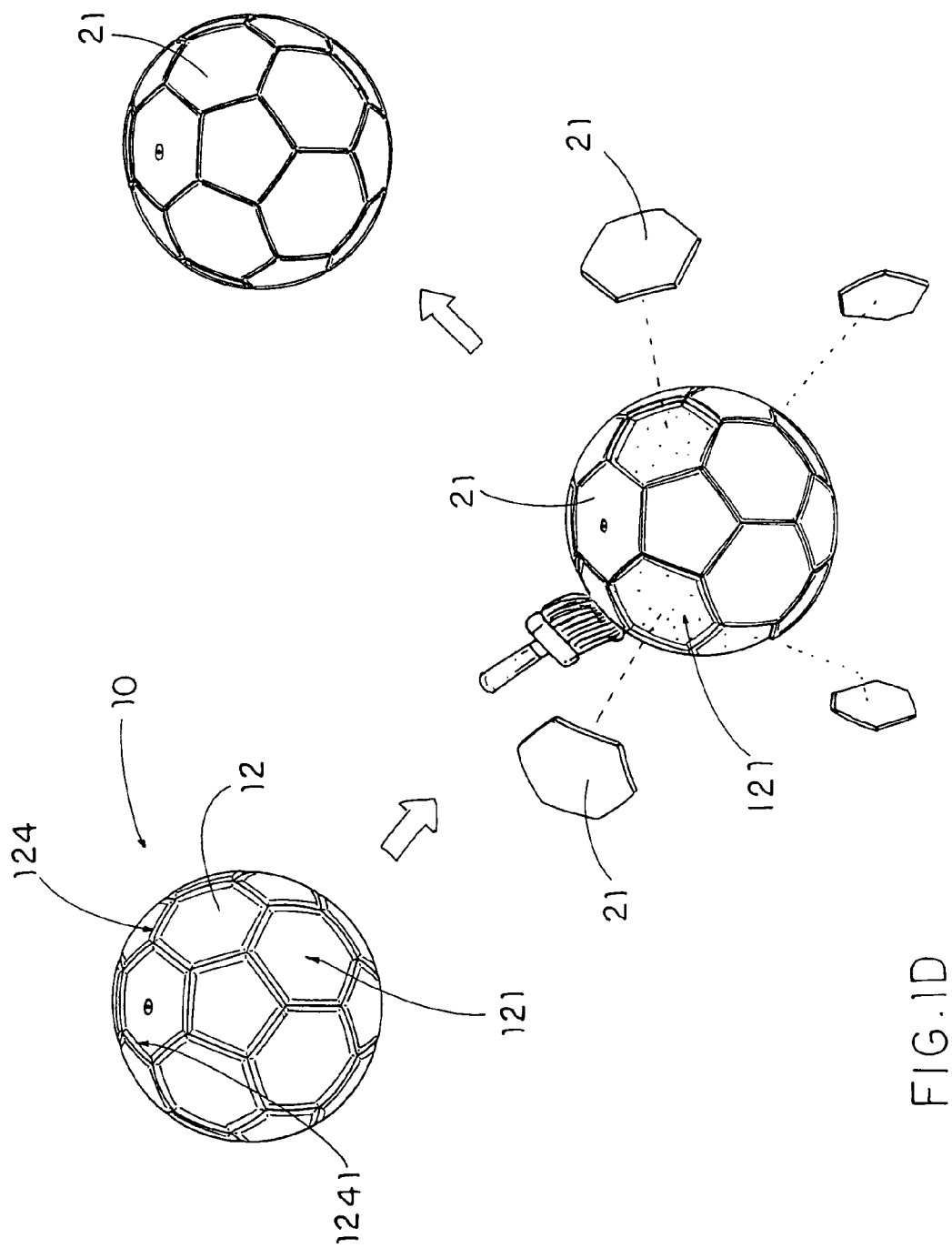

Referring to FIG. 1A, FIG. 1C, FIG. 1D, and FIG. 2 to FIG. 4 of the drawings, a method of manufacturing a sportsball according to the preferred embodiment of the present invention is illustrated, in which the method comprises the following steps.

(a) Provide an inflatable bladder body 11 and a ball casing 12 having a shape corresponding to the bladder body 11 after being inflated.

(b) Place the bladder body 11 and the ball casing 12 in a casing mold 70 that the bladder body 11 is enclosed within the ball casing 12.

(c) Vulcanize the ball casing 12 with heat to form a one-piece integrated body with the bladder body 11 received therein to form an integral barebone ball 10 as a semi-product of the sportsball, wherein a plurality of pre-formed channels 124 are integrally and indently formed on an outer circumferential surface 121 of the ball casing 12.

(d) Attach a plurality of cover panels 21 on the outer circumferential surface 121 of the ball casing 12 in such a manner that edges of each of the outer cover panels 21 are aligned with the corresponding pre-formed channels 124 respectively to form a ball cover 20 enclosing the barebone ball 10.

The step (a) further comprises a step of forming a construction layer 112 covering the bladder body 11. In one embodiment, as shown in FIG. 1A, FIG. 2, FIG. 3 and FIG. 4, the construction layer 112 is formed by the steps of:

(a-1) coating the outer surface of the bladder body 11 with adhesive; and (a-2) winding and adhering strengthened threads 113 on the outer surface of the inflatable bladder 111.

Therefore, during the step (c), the inflatable bladder 111 with the adhering strengthened threads 113 thereon are together cured by heating in the mold 70, so that the adhering strengthened threads 113 will be hardened to form a web layer as the construction layer 112 which is permanently united with the inflatable bladder 111 integrally.

In one embodiment, as shown in FIG. 1B and FIGS. 5-7, the construction layer 112 is a construction ball pocket 112' formed by the steps of:

(a-1') integrally connecting a plurality of ball pocket leaves 1121' with each other to form a spherical body; and (a-2') enclosing the bladder body 10 in the construction ball pocket 112'.

Step (b) further comprises a step of aligning two or more casing panels 126 in an edge-to-edge manner to form the ball casing 12 such that the casing panels 126 are aligned to enclose the bladder body 11 in the casing mold 70.

In the step (c), the casing mold 70 comprises a plurality of channel protrusions 71 integrally protruded from an inner mold surface to press against the outer circumferential surface 121 of the ball casing 12 received therein. Each of the channel protrusions 71 has two slanted pressing surfaces 711 such that, during vulcanization, the two slanted pressing surfaces 711 of each channel protrusion press against the outer circumferential surface 121 to form two slanted sidewalls 1241 indented on the outer circumferential surface 121 of the ball casing 12 to form the respective pre-formed channel 124.

After the vulcanizing step (c), the bladder body 11 is integrally bonded with the ball casing 12 to form a one piece integrated barebone ball 10 as a semi-product of the sportsball, wherein the plurality of pre-formed channels 124 are integrally and indently formed on an outer circumferential surface 121 of the ball casing 12. The ball casing 12 is made of rubber material for providing a cushion effect at any point of the barebone ball 10 after vulcanization.

Therefore, in the step (d), edge portions of the two neighboring outer cover panels 21 are attached on the slanted sidewalls 1241 of the corresponding pre-formed channel 124 respectively so as to be securely and fittedly attached onto the barebone ball 10. In the step (d), the outer cover panels 21 are securely and fittedly adhered on the outer circumferential surface 121 of the ball casing 12 of the barebone ball 10.

It is worth mentioning that the sportsball of the present invention can be manufactured as a soccer ball, a volley ball, an America football, or the like. Preferably, the soccer ball is made by the above mentioned structure and its manufacturing process thereof.

Figure 2:
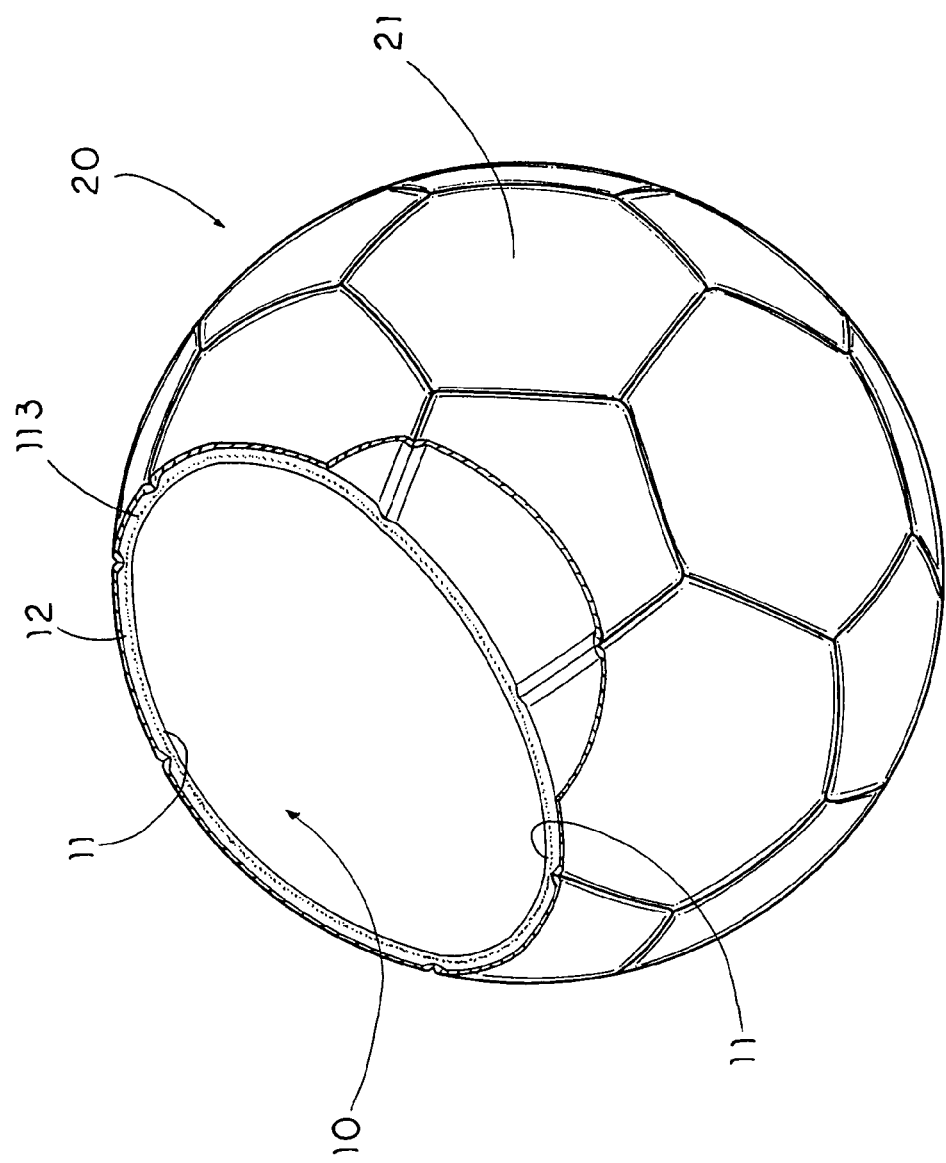
FIG. 2 is a perspective view of a sportsball according to a preferred embodiment of the present invention.
Figure 6:
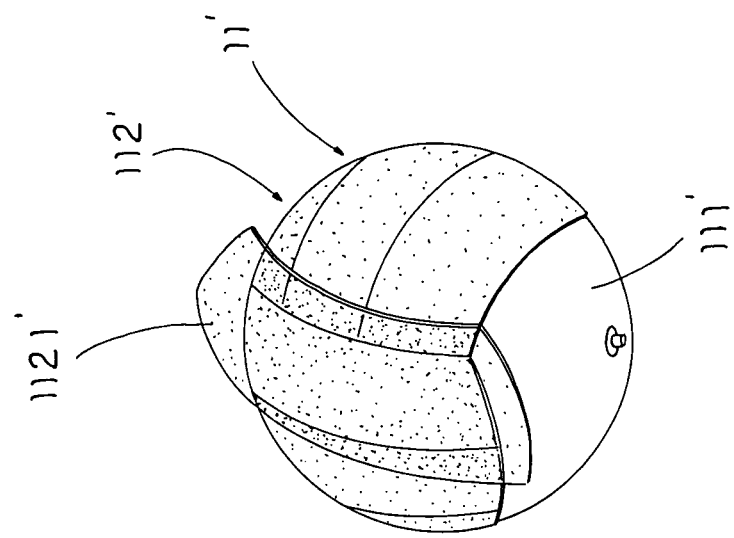
FIG. 6 is a perspective view of the alternative mode of the inflatable bladder body of the sportsball according to the above preferred embodiment of the present invention.
Figure 3:
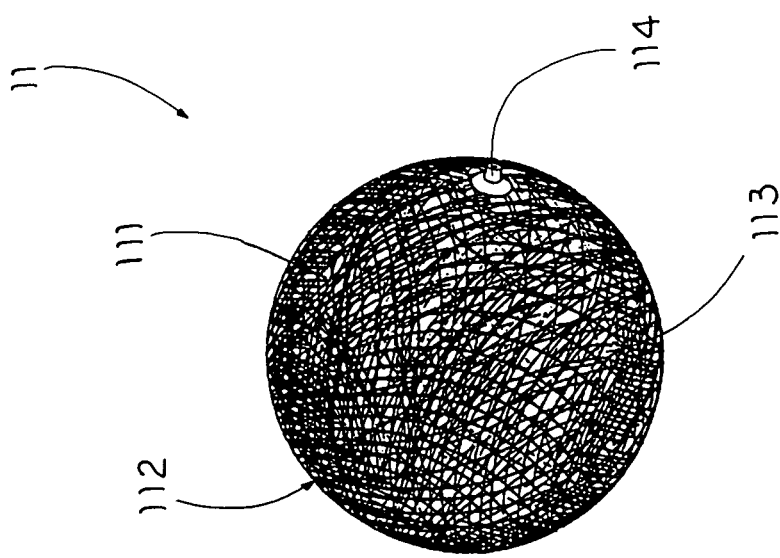
FIG. 3 is a perspective view of the inflatable bladder body of the sportsball according to the above preferred embodiment of the present invention.
Figure 7:
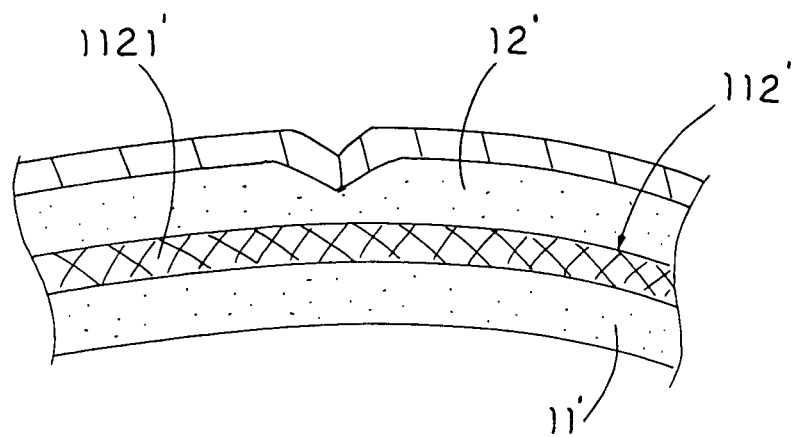
FIG. 7 is a sectional side view of the alternative mode of the sportsball according to the above preferred embodiment of the present invention.
Figure 4:
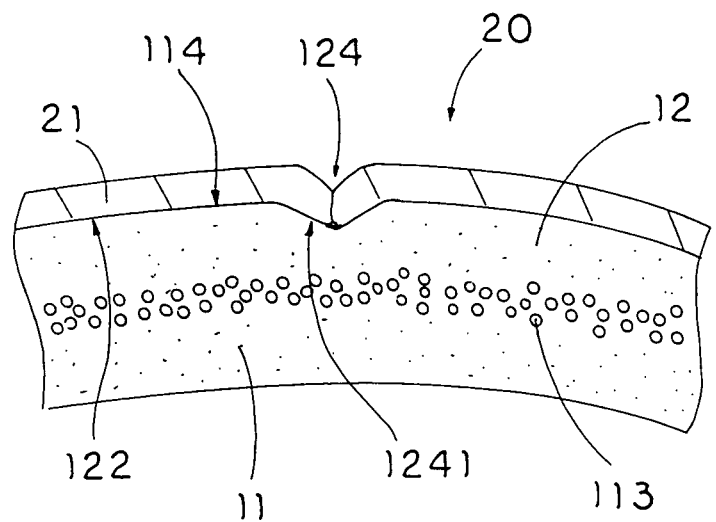
FIG. 4 is a sectional side view of the sportsball according to the above preferred embodiment of the present invention.
Figure 5:
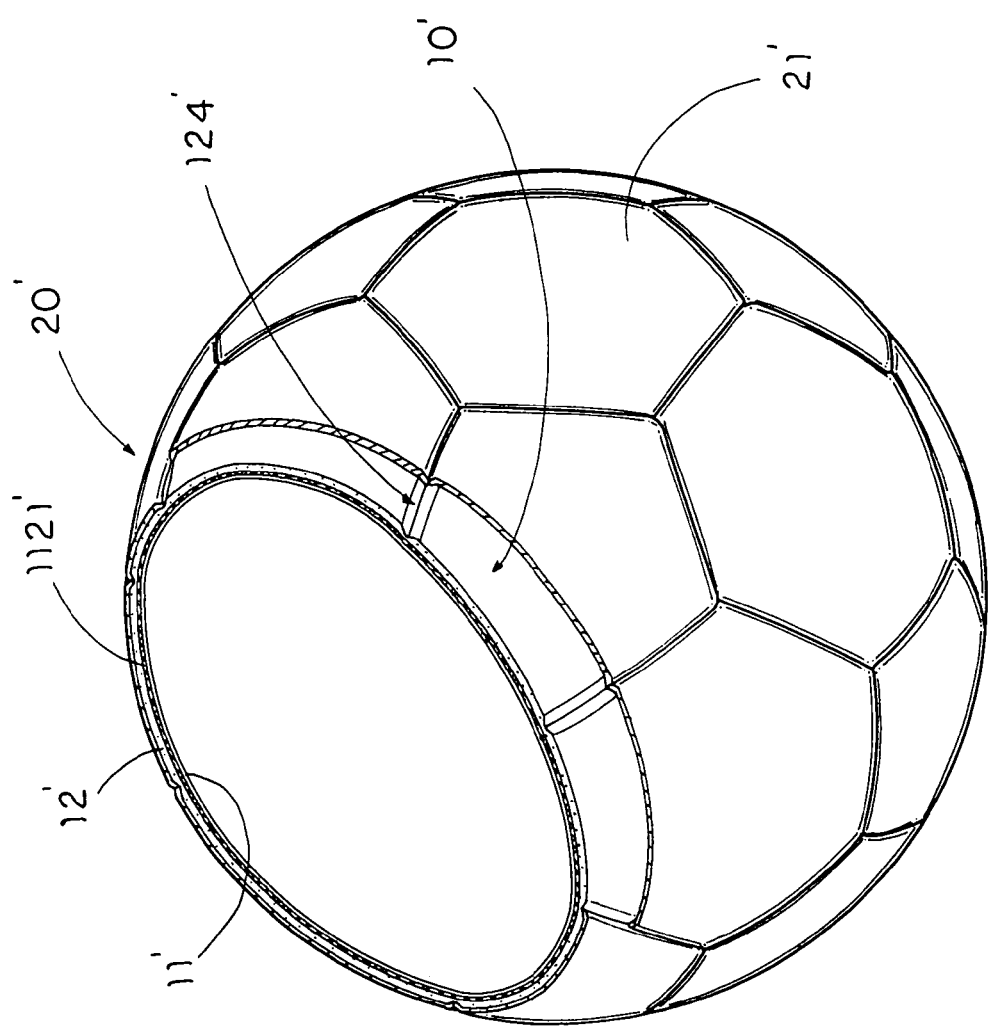
FIG. 5 is a perspective view of an alternative mode of the sportsball according to the above preferred embodiment of the present invention.

Referring to FIG. 2 to FIG. 4 of the drawings, a sportsball produced by the manufacturing method described above is preferably embodied according to the present invention is illustrated, in which the sportsball comprises a barebone ball 10 and an outer ball cover 20. According to the preferred embodiment, the sportsball of the present invention is illustrated as a soccer ball.

The barebone ball 10 comprises an inflatable bladder body 11 and a ball casing 12. The ball casing 12, which is formed in an one-piece integrated structure, has an outer circumferential surface 121, an inner circumferential surface 122 to define an interior cavity 123 to fittingly enclose the bladder body 11 therein, and a plurality of pre-formed channels 124 integrally and indently formed on the outer circumferential surface 121, such that the ball casing 12 and the bladder body 11 enclosed therewithin form a one piece integrated semi-product of the sportsball.

On the other hand, the outer ball cover 20 comprises a plurality of outer cover panels 21 overlappedly attaching on the outer circumferential surface 121 of the ball casing 12 at a position that edges of each of the outer cover panels 21 are aligned with the corresponding pre-formed channels 124 respectively so as to fittedly attach onto the ball casing 12.

According to the preferred embodiment of the present invention, each of the per-formed channels 124 has two slanted sidewalls 1241 indented on the outer circumferential surface 121 of the ball casing 12 such that edge portions of the two neighboring outer cover panels 21 are overlappedly attached on the sidewalls 1241 of the corresponding pre-formed channel 124 respectively such that each of the outer cover panels 21 are adapted to be fittedly attached onto the outer circumferential surface 121 along the corresponding pre-formed channels 124.

It is worth mentioning that an outer circumferential surface 114 of the bladder body 11 is integrated with the inner circumferential surface 122 of the ball casing 12 after the ball casing 12 is vulcanization treatment with heat to form the one piece integrated semi-product of the sportsball. As a result, the ball casing 12 and the bladder body 11 is integrated as a one-piece body so as to possess the optimal roundness of the ball casing 12 and the structural integrity and strength of the semi-product of the sportsball.

The ball casing 12 is preferred to be made of rubber or other soft materials (such as PVC, foaming materials etc.) for providing a cushion effect at any point of the barebone ball 10. Since the ball casing 12 is formed as a one-piece semi-product without involving stitching or any other mechanical connection mechanisms, the ball casing 12 is capable of possessing an outer shape with true roundness. The ball casing 12 provides an optimally even cushioning effect and maximal structural integrity and strength for the barebone ball 10 as well as the sportsball produced from the barebone ball 10. In other words, the present invention resolves the problem of inadequate roundness and weak structural integrity of conventional sportsball. Moreover, the outer cover panels 21 are attached on the outer circumferential surface 121 of the ball casing 12 of the barebone ball 10 by for example various adhesives depending on the material of the ball cover 20 to be used.

It is worth mentioning that the barebone ball 10 can also be considered as a final product of the sportsball without the outer ball cover 20, wherein the ball casing 12 of the barebone ball 10 can be considered as the carcass panels of the sportsball. Moreover, it is worth mentioning that the channels 124 pre-formed on the barebone ball 10 can also be used as a water repellent guiding channels when the sportsball of the present invention is played in a wet condition, such as in a raining day.

As shown in FIG. 3 of the drawings, the inflatable bladder body 11 comprises an inflatable bladder 111 for being inflated by air inflation and an exterior web layer 112, which is integrally attached on an outer surface of the inflatable bladder 111, and comprises at least an elongated strengthened thread 113 evenly wound around the outer surface of the inflatable bladder 111 such that the web layer 112 embraces the inflatable bladder 111 for resisting stress and impact force applied to the inflatable bladder 111.

In other words, the inflatable bladder body 10, which is disposed inside the ball casing 12, comprises a rubber made inflatable bladder 111 and a valve stem 114 mounted thereon wherein the ball casing 12 has a valve hole 125 formed thereon for aligning with the valve stem 114. The inflatable bladder body 10 comprises an exterior web layer 112 integrally attached on an outer surface of the inflatable bladder 111.

In order to enable the strengthened threads 113 being permanently affixed on the outer surface of the inflatable bladder 111, before winding onto the inflatable bladder 111, the strengthened threads 113 are coated with adhesive such as resin or glue for adhering onto the outer surface of the inflatable bladder 111 and each other. Moreover, the inflatable bladder 111 with the adhering strengthened threads 113 thereon are together cured by heating in a mold, so that the adhering strengthened threads 113 will be hardened to form the exterior web layer 112 which is permanently united with the inflatable bladder 111 integrally.

As an alternative mode shown in FIG. 1B, and FIG. 5 to FIG. 7 of the drawings, the barebone ball 10' comprises an inflatable bladder body 11' and a ball casing 12'. The ball casing 12', which is formed in a one-piece integrated structure, has an outer circumferential surface 121', an inner circumferential surface 122' to define an interior cavity 123' to fittingly enclose the bladder body 11' therein, and a plurality of pre-formed channels 124' integrally and indently formed on the outer circumferential surface 121', such that the ball casing 12' and the bladder body 11' enclosed therewithin form a one piece integrated semi-product of the sportsball.

On the other hand, the outer ball cover 20' comprises a plurality of outer cover panels 21' overlappedly attaching on the outer circumferential surface 121' of the ball casing 12' at a position that edges of each of the outer cover panels 21' are aligned with the corresponding pre-formed channels 124' respectively so as to fittedly attach onto the ball casing 12'.

The bladder body 11' comprises an inflatable bladder 111' for being inflated by air inflation and a construction ball pocket 112', which is made of fabric material and constructed to have a true roundness shape, having an interior receiving cavity defined therein to sealedly receive the inflatable bladder 111', such that the construction ball pocket 112' is arranged to retain a true roundness shape of the inflatable bladder 111' after the inflatable bladder 111' is inflated. According to the preferred embodiment, the inflatable bladder 111' is made of rubber or the like that is capable of being inflated with a compression air at a predetermined pressure for popping up and supporting the ball casing 12'.

The construction ball pocket 112' comprises a plurality of ball pocket leaves 1121' integrally connected with each other. Practically, the fabric made construction ball pocket 112' is able to form a spherical body that the construction ball pocket 112' is constructed to have a true roundness shape so as to retain a maximum diameter of the inflatable bladder 111' after it is inflated.

The construction ball pocket 112' is preferred to be made of fabric material having a durability, stretchability and adhesiveablility. Preferably, the construction ball pocket 112' can be made of a mixture fabric mixed with cotton and polyester because the cotton has a good stretchability and is able to absorb adhesive material and the polyester is durable and has a strong strength that is able to resist strain when the inflatable bladder 111' is inflated.

The inflatable bladder 111' may has the same size of the construction ball pocket 112' for perfectly fitting in the construction ball pocket 112'. Alternatively, the inflatable bladder 111' disposed in the construction ball pocket 112' may have a size slightly bigger than the inflatable bladder 111' in such a manner that when the inflatable bladder 111' is inflated, an outer spherical surface of the inflatable bladder 111' is preferred to be slightly spaced apart from an inner spherical surface of the construction ball pocket 112' to form an air cushion layer therebetween. The air cushion layer is adapted for providing a cushion effect for the sportsball to provide softness for the sportsball and tolerate heavier impact thereon.

It is worth mentioning that the barebone ball 10 may further comprises an inner lining layer integrally formed between the ball casing 12 and the inflatable bladder body 11 for further reinforcing a strength of the barebone ball 10.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A sportsball, comprising:
a barebone ball, which comprises:
an inflatable bladder body having a spherical shape;
a construction layer attached on an outer circumferential surface of said inflatable bladder body for retaining a true roundness of said inflatable bladder body; and
two casing panels, wherein each of said casing panels is formed in a one-piece integrated structure, wherein each of said casing panels has an outer circumferential surface, an inner circumferential surface, and a plurality of pre-formed channels integrally and indently formed on said outer circumferential surface of said casing panel that two slanted sidewalls indented thereon to define said pre-formed channel between said two slanted sidewalls, wherein said two casing panels are attached with each other edge-to-edge not only to form a ball casing in order to enclose said bladder body within said two casing panels but also to align said pre-formed channels of one of said casing panels with said pre-formed channels of another said casing panel, wherein said outer circumferential surface of said inflatable bladder body is integrated with said inner circumferential surface of each of said casing panels to form said barebone ball with an integral body and with said pre-formed channels thereon, wherein each of said casing panels is made of rubber material for providing a cushion effect at any point of said barebone ball and for ensuring a true roundness of said barebone ball; and
an outer ball cover comprising a plurality of outer cover panels attached on said outer circumferential surface of each of said casing panels, wherein edges of each of said outer cover panels are aligned with said corresponding pre-formed channels respectively, wherein edge portions of said two neighboring outer cover panels are attached on said slanted sidewalls of said corresponding pre-formed channel respectively, wherein said outer cover panels are adhered on said outer circumferential surface of each of said casing panels of said barebone ball.

2. The sportsball, as recited in claim 1, wherein said construction layer comprises an exterior web layer, which is integrally attached on said outer circumferential surface of said inflatable bladder body, wherein said exterior web layer comprises at least an elongated strengthened thread evenly wound around said outer circumferential surface of said inflatable bladder body such that said web layer embraces said inflatable bladder body for resisting stress and impact force applied to said inflatable bladder body, wherein said strengthen thread is hardened and is permanently united with said inflatable bladder integrally.

3. The sportsball, as recited in claim 1, wherein said construction layer comprises a construction ball pocket, which is made of fabric material and constructed to have a true roundness shape, having an interior receiving cavity defined therein to sealedly receive said inflatable bladder body, such that said construction ball pocket is arranged to retain a true roundness shape of said inflatable bladder body after said inflatable bladder body is inflated.

4. A barebone ball, comprising:
an inflatable bladder body having a spherical shape;
a construction layer attached on an outer circumferential surface of said inflatable bladder body for retaining a true roundness of said inflatable bladder body; and
two casing panels, wherein each of said casing panels is formed in a one-piece integrated structure, wherein each of said casing panels has an outer circumferential surface, an inner circumferential surface, and a plurality of pre-formed channels integrally and indently formed on said outer circumferential surface of said casing panel that two slanted sidewalls indented thereon to define said pre-formed channel between said two slanted sidewalls, wherein said two casing panels are attached with each other edge-to-edge not only to form a ball casing in order to enclose said bladder body within said two casing panels but also to align said pre-formed channels of one of said casing panels with said pre-formed channels of another said casing panel, wherein said outer circumferential surface of said inflatable bladder body is integrated with said inner circumferential surface of each of said casing panels to form said barebone ball with an integral body and With said pre-formed channels thereon, wherein each of said casing panels is made of rubber material for providing a cushion effect at any point of said barebone ball and for ensuring a true roundness of said barebone ball,
an outer ball cover comprising a plurality of outer cover panels attached on said outer circumferential surface of each of said casing panels.

5. The barebone ball, as recited in claim 4, wherein said construction layer comprises an exterior web layer, which is integrally attached on said outer circumferential surface of said inflatable bladder body, wherein said exterior web layer comprises at least an elongated strengthened thread evenly wound around said outer circumferential surface of said inflatable bladder body such that said web layer embraces said inflatable bladder body for resisting stress and impact force applied to said inflatable bladder body, wherein said strengthen thread is hardened and is permanently united with said inflatable bladder integrally.

6. The barebone ball, as recited in claim 4, wherein said construction layer comprises a construction ball pocket, which is made of fabric material and constructed to have a true roundness shape, having an interior receiving cavity defined therein to sealedly receive said inflatable bladder body, such that said construction ball pocket is arranged to retain a true roundness shape of said inflatable bladder body after said inflatable bladder body is inflated.

\* \* \* \* \*